April 14, 1925.  J. A. KUNZ  1,533,504
LINE CLAMP
Filed Nov. 8, 1921
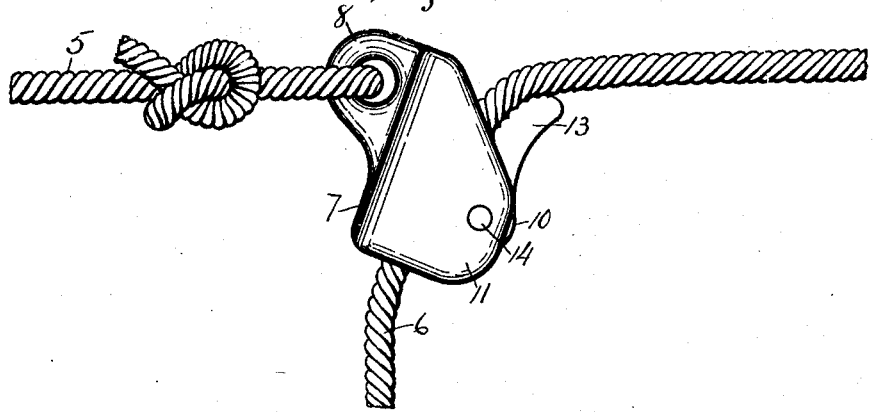
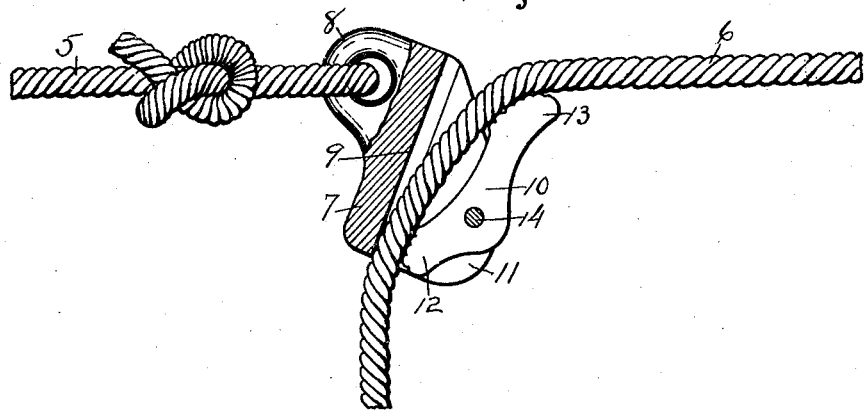
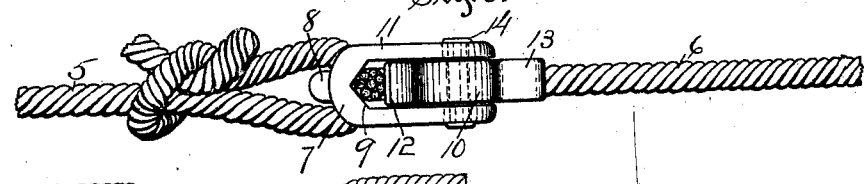
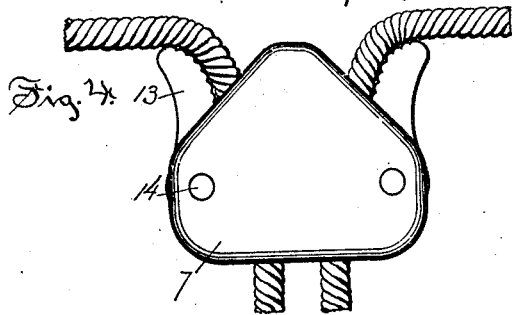
INVENTOR
Joseph A. Kunz.
by
Arthur B. Jenkins,
ATTORNEY Patented Apr. 14, 1925.

1,533,504

UNITED STATES PATENT OFFICE.

JOSEPH A. KUNZ, OF HARTFORD, CONNECTICUT.

LINE CLAMP.

Application filed November 8, 1921. Serial No. 513,640.

*To all whom it may concern:*

Be it known that I, JOSEPH A. KUNZ, a citizen of the United States, and a resident of Hartford, in the county of Hartford and State of Connecticut, have invented new and Improved Line Clamps, of which the following is a specification.

My invention relates to that class of devices that are employed for securing an end of a length of line or rope, and an object of my invention, among others, is to provide a device of this class that shall be simple in construction, durable, and particularly efficient in operation.

One form of line clamp embodying my invention and in the construction and use of which the objects herein set out, as well as others, may be attained, is illustrated in the accompanying drawings, in which—

Figure 1 is a side view of my improved line clamp showing one end of a line attached thereto and the opposite end held by the clamp.

Figure 2 is a view in section through the clamp illustrating its method of operation.

Figure 3 is an end view of the clamp.

Figure 4 is a view illustrating a modified form of the structure.

My improved clamp is not confined in its use for the purpose of securing the end of a line employed for any special purpose, it being particularly applicable for securing the end of a line or lines that is or are required to be loosened at certain times, and as such a situation occurs in the use of pulley clothes lines, I have selected such for the purpose of illustrating my invention herein, similar conditions also existing in guy-ropes for tents &c.

In the accompanying drawings the numeral 5 indicates the attached end, as of a pulley line, and 6 the free end thereof, the attached end 5 being secured as by a knot to my improved fastening that comprises a body 7 having a loop 8 on one side within which the attached end 5 of the line is secured, and a groove 9 on the side opposite the loop 8. A clamp lever 10 is pivotally mounted between the sides 11 of the clamp, said sides with the base 7 forming the groove 9. The lever comprises a clamping arm 12 and an actuating arm 13, the latter preferably being longer from the pivot 14 than is the clamping arm 12. The lever is formed and mounted between the sides 11 so that the end of the actuating arm 13 will be substantially in line with the attached and free ends 5 and 6 of the line when they are drawn taut, and especially as shown in Figure 2 of the drawings. In this position it will be noted that the strain on the line causes the free end 6 to exert a pull on the actuating arm 13 of the lever, thereby forcing the clamping arm 12 into close engagement with the free end of the line, thus clamping it tightly between the end of the clamping arm 12 and the bottom of the groove 9, and the more the strain exerted upon the free end 6 of the line the tighter will be the engagement of the clamping arm 12 with the line. The edges of the lever 10 in contact with the line may be corrugated if desired, in order to increase the frictional resistance of the lever to movement of the line.

It will be seen that the device is of particular advantage when used in connection with a pulley line or with the guy rope of a tent or the like, as all that is required to tighten the line is to pull downwardly on its free end thus pulling it through the groove 9, this act loosening the lever so that no obstruction to this movement of the line will be occasioned. However, just as soon as the pulling strain on the end of the line is relieved it will be taken up by that portion of the line in contact with the actuating arm 13 thereby forcing the lever into tight engagement with the line and preventing its end from escaping from the hold of the clamp.

In accordance with the provisions of the patent statutes, I have described the principles of operation of my invention, together with the device which I now consider to represent the best embodiment thereof; but I desire to have it understood that the device shown is only illustrative, and that the invention may be carried out by other means.

In the form of the device as shown in Figure 4 a double structure is formed, the loop 8 being dispensed with and the end of the line that, in that form of the device, is secured to the loop, is passed through the body 7 and is held by a lever and clamp similar to that hereinbefore described.

I claim—

1. A line clamp including a body having a groove therein, a lever pivotally attached to the body within said groove and comprising an actuating arm, and a clamping arm, and means located on said body opposite said actuating arm and at the same end of the body for attachment of the end of a line thereto.

2. A line clamp including a rectangularly shaped body having a groove therein, a lever pivotally mounted at one side of said body within said groove and comprising an actuating arm and a clamping arm, and means on the opposite side of said body for attachment of a line thereto on a line passing through said actuating arm at substantially right angles to the lengthwise center line of said body.

JOSEPH A. KUNZ.